(12) United States Patent
Dayar et al.

(10) Patent No.: US 7,502,729 B2
(45) Date of Patent: Mar. 10, 2009

(54) EMULATING DIFFERENT COUNTRY KEYBOARDS FOR CONTROLLING A REMOTE COMPUTER OVER A NETWORK

(75) Inventors: Zeynep Dayar, Cary, NC (US); Gregg Kent Gibson, Apex, NC (US); Eric Richard Kern, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 10/742,421

(22) Filed: Dec. 19, 2003

(65) Prior Publication Data

US 2005/0138209 A1   Jun. 23, 2005

(51) Int. Cl.
  *G06F 17/50* (2006.01)
  *G06F 9/455* (2006.01)
  *G06F 15/173* (2006.01)
  *G06F 15/16* (2006.01)

(52) U.S. Cl. .................... 703/27; 703/1; 703/24; 709/223; 709/246

(58) Field of Classification Search ............... 709/246, 709/223; 703/1, 24, 27
  See application file for complete search history.

(56) References Cited

U.S. PATENT DOCUMENTS

| | | | |
|---|---|---|---|
| 5,717,428 A * | 2/1998 | Barrus et al. ............... 345/168 |
| 5,841,424 A * | 11/1998 | Kikinis ....................... 345/168 |
| 6,549,949 B1 * | 4/2003 | Bowman-Amuah ......... 709/236 |
| 6,601,108 B1 * | 7/2003 | Marmor ...................... 709/246 |
| 6,912,663 B1 * | 6/2005 | Dayan et al. .................. 726/16 |
| 7,020,697 B1 * | 3/2006 | Goodman et al. ........... 709/223 |
| 2003/0131136 A1 * | 7/2003 | Emerson et al. ............. 709/250 |

FOREIGN PATENT DOCUMENTS

WO   WO 98/44424   * 10/1998

* cited by examiner

*Primary Examiner*—Paul L Rodriguez
*Assistant Examiner*—Nithya Janakiraman
(74) *Attorney, Agent, or Firm*—H. Artoush Ohanian; Cynthia S. Byrd; Biggers & Ohanian LLP.

(57) ABSTRACT

An administrative computer sends keyboard commands over a network to control a remote computer. If the keyboard at the administrative and remote computers are different in key layout or language, a remote console software application permits the administrative computer to emulate the keyboard of the remote computer. The remote console application includes a graphical user interface through which the administrator can select the particular key layout and language to emulate for compatibility with the keyboard at the remote computer. The remote console application converts the key code for the key that was pressed at the administrative keyboard into a USB usage code that corresponds to a key on the remote keyboard. This usage code is encapsulated in an Ethernet packet and transmitted over the network to the remote computer. This Ethernet packet is decoded at the remote location and coupled to the remote computer over a USB bus.

10 Claims, 3 Drawing Sheets

EMULATING DIFFERENT COUNTRY KEYBOARDS FOR CONTROLLING A REMOTE COMPUTER OVER A NETWORK

BACKGROUND OF THE INVENTION

This invention relates generally to computing systems and, in particular, to remotely managed network computing systems. Still, more particularly, the present invention relates to a system and method for dynamically configuring a keyboard of an administrative computer system for language and layout compatibility with another keyboard at a remote computer system being managed by the administrative system.

While early computers were "stand alone" and unable to communicate with other computers, most computers today are capable of communicating with other computers for a variety of purposes, including sharing data, e-mailing, downloading programs, coordinating operations, etc. Each computer typically connects to a network via a Network Interface Card (NIC) or an integrated Local Area Network (LAN) On Motherboard (LOM). The network couples multiple computers and peripheral devices, such as printers, secondary storage, etc. The network may be a Local Area Network (LAN) or a Wide Area Network (WAN).

A LAN is usually a small local network, wired or wireless, that is typically used by a single enterprise. LANs use network architectures such as an Ethernet, Token Ring, ARCnet or a wireless protocol such as 802.11a/b/g, and are used to connect computers and peripheral devices within a limited area, such as a single campus or building.

Computers are not limited to the confines of a LAN, but can also be connected to another computer or peripheral device via a wide area network (WAN), such as the Internet, to provide a communications link over a larger area. Each computer can be directly connected to a WAN via a Network Interface Card (NIC) or LOM, or the computer can be indirectly connected to the WAN via the LAN. The WAN can be wired or wireless, similar to that described for the LAN.

One advantage of a network based computer system is that computer systems can be remotely controlled through the network, wherein an administrative computer system manages a remote computer system via a network connection. Such remote control would include keyboard and mouse control, as well as video control of the remote computer system. A problem arises, however, when the keyboard used at the administrative computer system is different (for example, different in language or key layout) from the keyboard at the remote computer system. Therefore, what is needed is a method and system for an administrative computer system to select a particular type of keyboard to emulate, such that there is compatibility between the administrative keyboard and the remote keyboard.

SUMMARY OF THE INVENTION

A remote console application displays the console of a remote computer and allows keyboard and mouse control of the remote computer. In a USB-based remote console application, keyboard and mouse control messages are sent over a network to an intermediate device that presents the keyboard and mouse messages to the remote computer as USB input.

When a key is pressed in the remote console application on the client system, the application receives an event that indicates the meaning of the key, such as the capital letter, 'E'. The event does not include a scan code or any other information about the location of the key that was pressed. The meaning of the key has already been interpreted from the key location, and the location information has been discarded by the time the application receives it. However, the key meaning must be converted back to a USB usage code that conveys the key location information so it can be presented to the remote computer via USB. The location of the key cannot be derived directly from the interpreted key meaning because keys may appear in different locations on different keyboards. For instance, the letter 'A' on a US keyboard appears in the same location as the letter 'Q' on a French keyboard.

A set of tables is used to map the key meanings to the appropriate USB usage code which indicates the location of the key that is pressed. A pull-down menu is presented to the user to allow him to determine which of the tables is used to map the key meaning to a usage code.

This solution does not impose the restriction that the client system and the remote system use the same type of keyboard. A client system with a US keyboard can interact correctly with a remote system with a French keyboard. The user selects 'French' in the keyboard pull-down menu and types keys as they are shown on his US keyboard. The keys are mapped to the usage codes for a French keyboard and appear correctly on the remote system.

DESCRIPTION OF THE PREFERRED EMBODIMENTS

Figure 1:
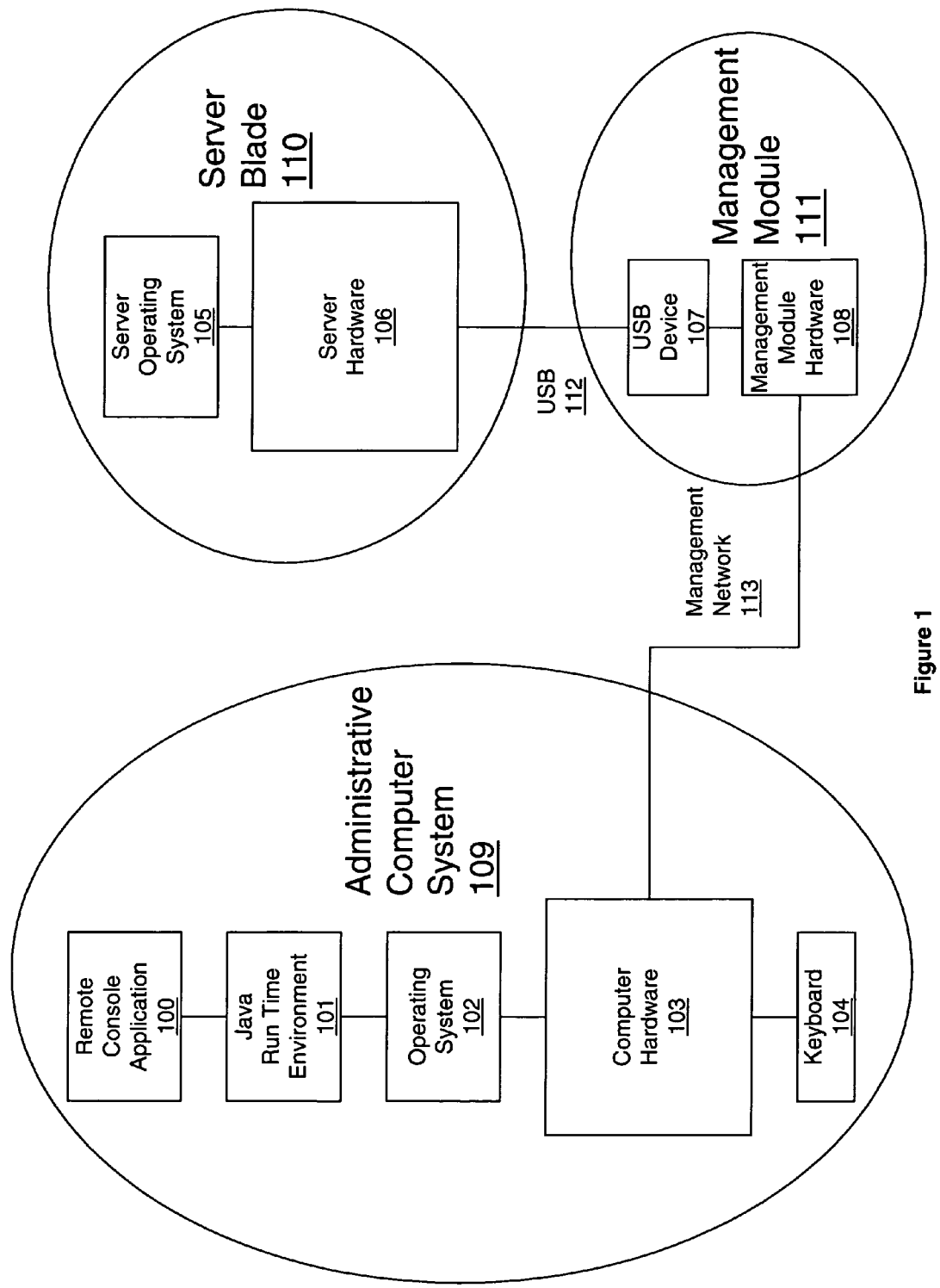
FIG. 1 is a block diagram of the preferred embodiment of a system of the current invention.

FIG. 1 is a block diagram of an embodiment of a system of the current invention having an administrative computer system 109 and a remote computer system 110-111. In this particular embodiment, the remote computer system is represented by a well known server blade 110 and management module 111; however, those skilled in the art will recognize that the invention is not limited to server blades, and may be practiced with other types of remote computer systems, such as desktop computers, work stations, notebook computers and any other form of a server or computer.

Referring to FIG. 1, when an administrator depresses and releases a particular key on keyboard 104, a corresponding well known keyboard code is passed to computer hardware 103 which, in a well known manner, generates an interrupt to operating system 102 and passes the keyboard code to the operating system. Operating system 102 outputs a well known operating system key code to Java™ runtime environment 101 (Java is a trademark of Sun Microsystems Inc), which generates a well known Java key event and passes it to remote console application 100 .

Figure 2:
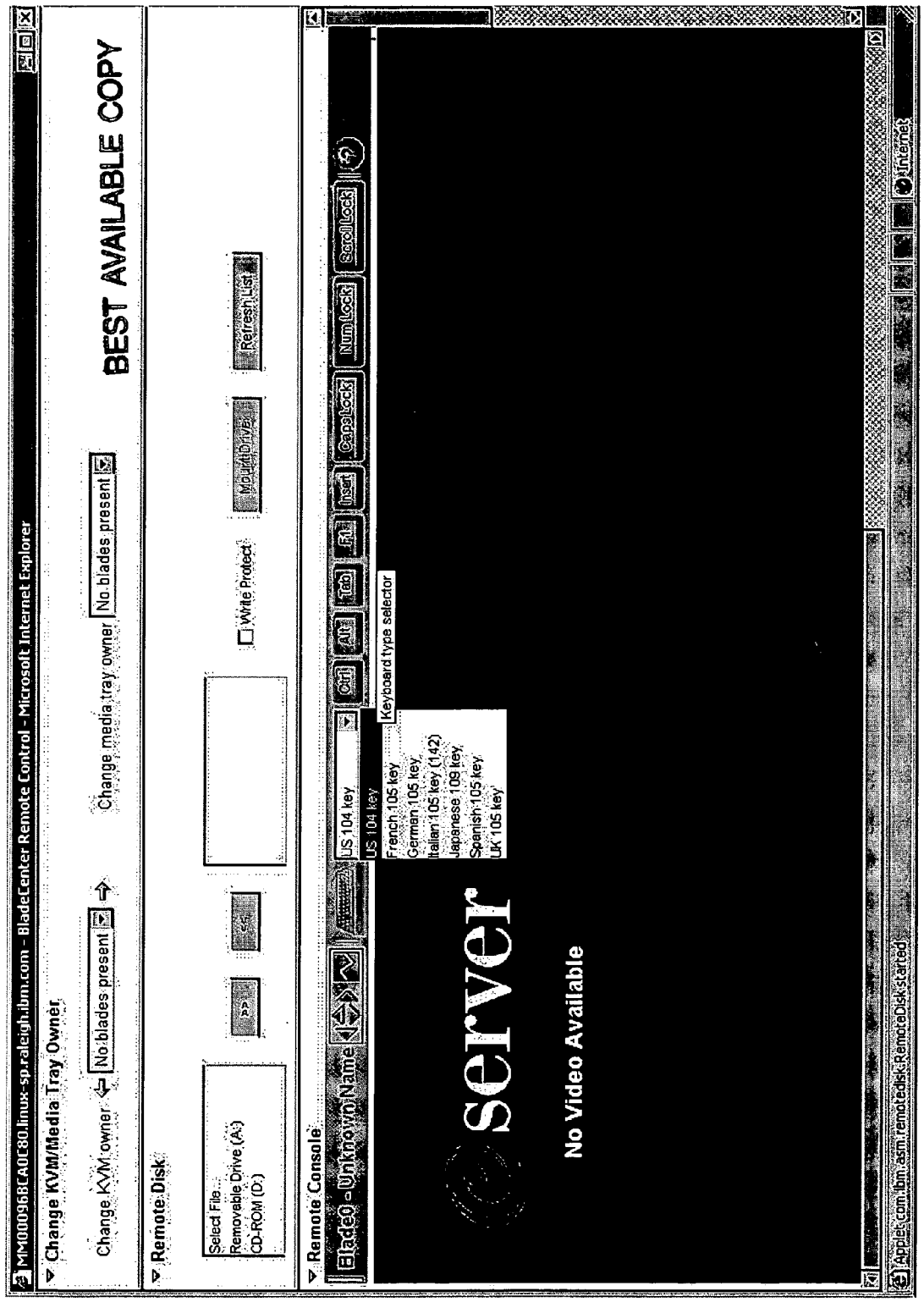
FIG. 2 is an illustration of the preferred graphical user interface that is displayed on the administrative computer system's monitor, and that permits the administrator to select a particular keyboard layout and language to emulate.

FIG. 2 is an illustration of the preferred graphical user interface that is displayed on the administrative computer system's monitor and that permits, in a well known manner, the administrator to select a particular keyboard layout and language to emulate through the use of the illustrated pull-down window. In operation, the administrator opens the illustrated pull-down window, and then selects the desired keyboard layout and language to emulate. This graphical user interface is implemented in the remote console software application 100.

The duplicate compact disks (CD-R) filed with this application contain the file ID "RPS920030252KeyMappingComputerCode.txt", which is incorporated herein by reference (a print out of this file is also included with this application entitled "Key Mapping Computer Code"). This file was created on 12-19-03 and is 51K bytes in length. This computer code is written in well known Java code, and this code is implemented in remote console application 100. The function of this code is described below with respect to the operation of the remote console application.

Returning to FIG. 1, remote console application 100 receives the administrator's keyboard layout and language selection as entered through the use of the graphical user interface of FIG. 2, as well as the Java key event from Java run time environment 101. Using these two inputs, the Key Mapping Computer Code referenced above causes a well known Universal Serial Bus or "USB" usage code to be generated. This USB usage code is then passed down through Java run time environment 101 and operating system 102 to computer hardware 103, and is wrapped in a well known Ethernet packet in the process. This Ethernet packet containing the USB usage code is transmitted over management network 113.

Management module hardware 108 contained in management module 111 receives the Ethernet packet containing the USB usage code and unwraps the usage code in a well known manner, and passes it to a well known USB device 107. USB device 107 then wraps the USB usage code in a well known USB packet, and outputs this packet to server hardware 106. Server hardware 106 then generates an interrupt to server operating system 105, and transfers the USB packet containing the USB usage code to the operating system for processing.

Figure 3:
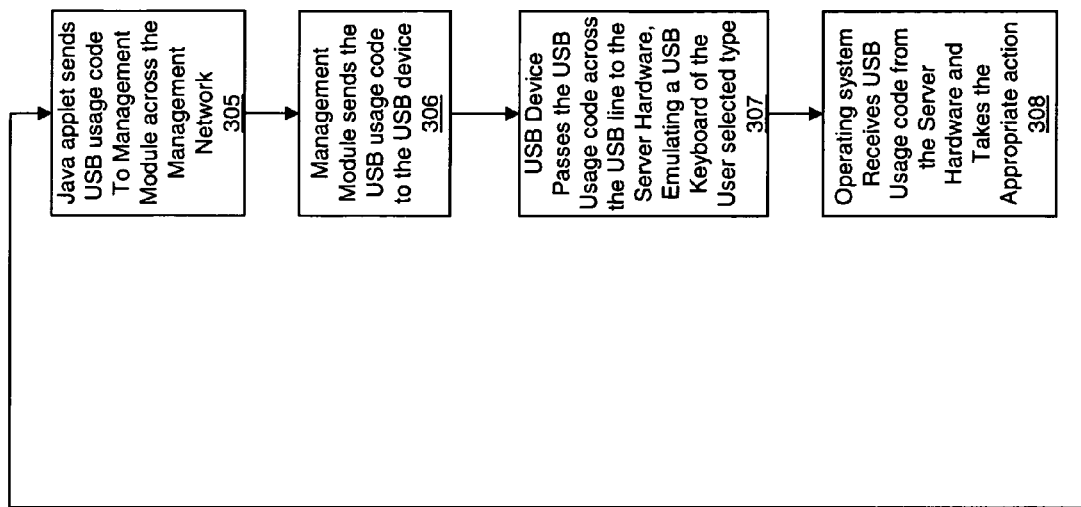
FIG. 3 is a data flow diagram of the system of the current invention, illustrating the flow of data from the keyboard of the administrative computer, through the operating system of the remote computer system.
Figure 3:
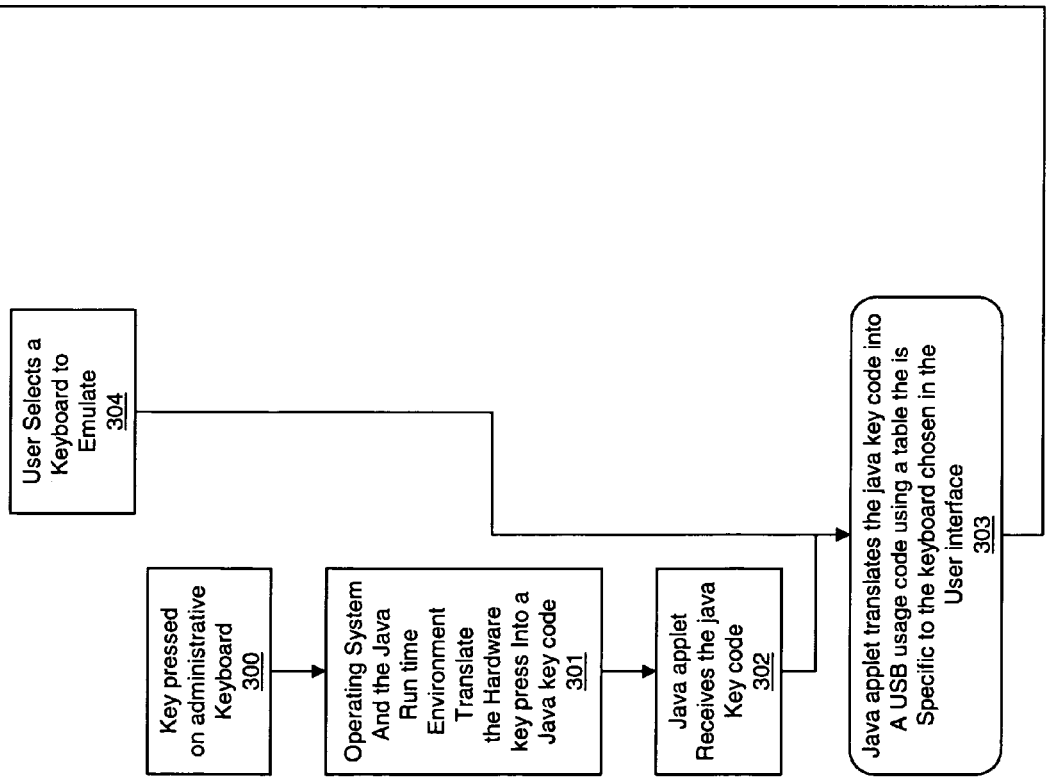

FIG. 3 is a data flow diagram of the system of the current invention, illustrating the flow of data from keyboard 104 of the administrative computer 109, through the server operating system 105 of the remote computer System 110-111. Referring to this figure, in Step 300, an administrator presses and releases one of the keys of keyboard 104, which sends a corresponding keyboard code to computer hardware 103. In next Step 301, this keyboard code is translated by the administrative computer's hardware 103, operating system 102 and Java runtime environment or "JRE" 101 to produce a well known Java key event. A Java key event contains the Java key code assigned to the key that was pressed by the administrator, the character produced by the key when applicable, a key press or key release indicator, general location information (for example, main part of the keyboard, numeric keypad, left or right for keys such as shift, ctrl, and alt) and any modifiers (such as the shift or ctrl keys) that also may have been pressed. However, the Java key event does not include keyboard layout and language information, which gets dropped by the operating system, so there is insufficient data to positively identify the actual key that was pressed.

In Step 302, the Java key event is received by the remote console software application 100. In next Step 303, the remote console application translates the Java key event into a USB usage code, using the Java key code, the location information, and the selected keyboard type. The keyboard type was previous selected by the administrator in Step 304, as further illustrated in FIG. 2. As implemented in the file entitled "RPS920030252KeyMappingComputerCode.txt", the Java key codes are initially mapped to the appropriate USB usage codes for a US 104-key keyboard. If the selected keyboard type is something other than a US 104-key keyboard, the mapping for the various keys is overridden.

In next Step 305, remote console Application 100 sends the appropriate USB usage code to management module 111 over management network 113. This is accomplished by wrapping the USB usage code in an Ethernet packet, or other network protocol format such as token ring. In next Step 306, management module 111 passes the USB usage code to USB device 107 after unwrapping the usage code from the Ethernet packet. In Step 307, USB device 107 formats the received USB usage code into a USB message, which emulates a USB keyboard and sends the USB message to Server Blade 110 over USB Connection 112. In last Step 308, server hardware 106 receives this USB message, which appears to it as if it originated with a USB keyboard. Server Operating System 105 interprets the USB Message and processes it in a well known manner.

What is claimed is:

1. A method of keyboard emulation, the method implemented with a first computer that controls a second computer, the first computer having a keyboard of a first keyboard type, the first computer configured with an identification of a second keyboard type and a key code conversion table, the second computer connected to the first computer by a data communications network, the second computer operating with key codes representing keystrokes on a keyboard of the second keyboard type, the method comprising:

receiving in the first computer a key code representing a keystroke on the first keyboard;

converting by the first computer the key code to a Universal Serial Bus ('USB') usage code representing a keystroke on a keyboard of the second keyboard type, the converting carried out in dependence upon the second keyboard type, and the key code conversion table; and providing the USB usage code from the first computer to a second computer through the data communications network.

2. The method of claim 1 further comprising configuring the first computer with the identification of a second keyboard type, including receiving from a user a selection of a second keyboard type.

3. The method of claim 1 wherein receiving a key code representing a keystroke on the first keyboard further comprises:

receiving the key code in the operating system;

translating, by the operating system, the key code into an operating system key code; and creating, in dependence upon the operating system key code, a java key event, the java key event including a Java key code assigned to the keystroke.

4. The method of claim 1 wherein converting the key code to a Universal Serial Bus ('USB') usage code further comprises:

receiving, in a java key event, a java key code; and determining, in dependence upon the java key code and the second keyboard type, the USB usage code.

5. The method of claim 1 wherein providing the USB usage code from the first computer to a second computer through the data communications network further comprises:

wrapping by the first computer the USB usage code in a data communications packet; and transmitting the data communications packet through the data communications network from the first computer to the second computer.

6. Apparatus for keyboard emulation, the apparatus including a first computer that controls a second computer, the first computer having a keyboard of a first keyboard type, the first computer configured with an identification of a second keyboard type and a key code conversion table, the second computer connected to the first computer by a data communications network, the second computer operating with key codes representing keystrokes on a keyboard of the second keyboard type, the apparatus comprising a computer processor and a computer memory operatively coupled to the computer processor, the computer memory having disposed within it computer program instructions capable of:

receiving in the first computer a key code representing a keystroke on the first keyboard;

converting by the first computer the key code to a Universal Serial Bus ('USB') usage code representing a keystroke on a keyboard of the second keyboard type, the converting carried out in dependence upon the second keyboard type, and the key code conversion table; and providing the USB usage code from the first computer to a second computer through the data communications network.

7. The apparatus of claim 6 further comprising computer program instructions capable of configuring the first computer with the identification of a second keyboard type, including receiving from a user a selection of a second keyboard type.

8. The apparatus of claim 6 wherein receiving a key code representing a keystroke on the first keyboard further comprises:

receiving the key code in the operating system;

translating, by the operating system, the key code into an operating system key code; and creating, in dependence upon the operating system key code, a java key event, the java key event including a Java key code assigned to the keystroke.

9. The apparatus of claim 6 wherein converting the key code to a Universal Serial Bus ('USB') usage code further comprises:

receiving, in a java key event, a java key code; and determining, in dependence upon the java key code and the second keyboard type, the USB usage code.

10. The apparatus of claim 6 wherein providing the USB usage code from the first computer to a second computer through the data communications network further comprises:

wrapping by the first computer the USB usage code in a data communications packet; and transmitting the data communications packet through the data communications network from the first computer to the second computer.

\* \* \* \* \*